Patented June 24, 1924.

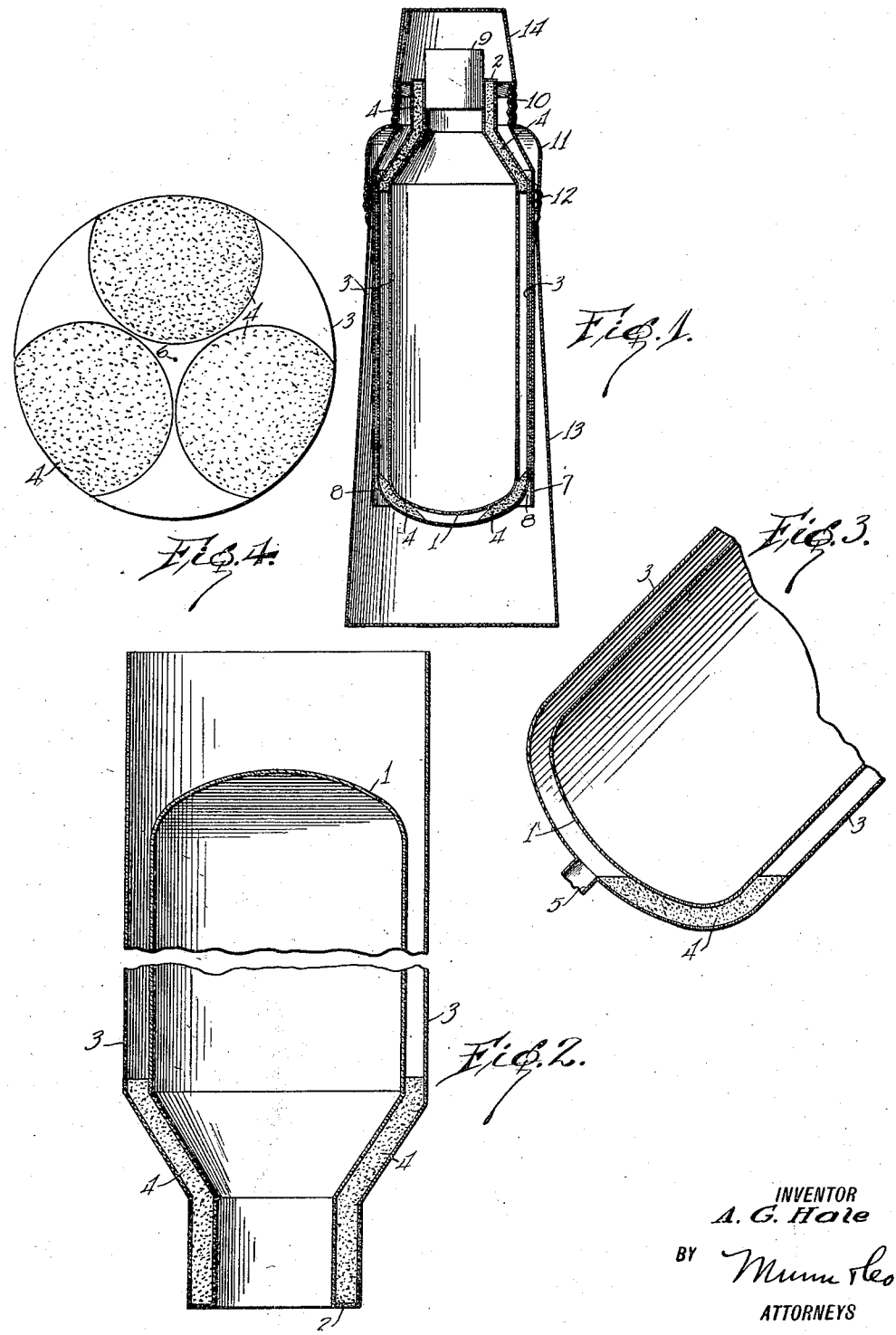

1,498,837

UNITED STATES PATENT OFFICE.

ALBERT GIBSON HALE, OF FORT THOMAS, KENTUCKY.

VACUUM BOTTLE AND PROCESS OF MAKING THE SAME.

Application filed June 20, 1921, Serial No. 478,877. Renewed November 16, 1923.

*To all whom it may concern:*

Be it known that I, ALBERT GIBSON HALE, a citizen of the United States, and a resident of Fort Thomas, in the county of Campbell and State of Kentucky, have invented a new and useful Improvement in Vacuum Bottles and Processes of Making the Same, of which the following is a full, clear, and exact description.

My invention relates to vacuum bottles, and it consists in the combinations, constructions and arrangements herein described and claimed.

An object of my invention is to provide a vacuum bottle having an inner shell and an outer shell or vacuum jacket spaced therefrom at each end thereof, whereby a bottle of greater than usual strength is provided.

A further object of my invention is to provide a vacuum bottle having frangible inner and outer shells joined at one end and spaced apart at each end by a non-conducting substance introduced therebetween, while in a plastic state.

A further object of my invention is to provide a device of the character described that is more durable than a bottle of ordinary construction when a frangible material of a given strength is used in forming the shells of the bottle.

A further object of my invention is to provide a process by means of which the inner and outer shells of the bottle are spaced apart and strengthened at the neck of the bottle.

A further object of my invention is to provide a process by means of which a vacuum bottle is provided in which the inner and outer shells are spaced apart and reenforced both at the neck and at the closed end thereof.

Other objects and advantages will appear in the following specification, and the novel features of the invention will be particularly pointed out in the appended claims.

My invention is illustrated in the accompanying drawings, forming part of this application, in which—

Figure 1 is a vertical section of a vacuum bottle construction embodying a bottle formed in accordance with the present invention, Figure 2 is a central section through the bottle, the outer shell thereof being shown in initial or open position, Figure 3 is a similar view of a fragmentary portion of the device, the outer shell thereof being shown in partially closed position, and Figure 4 is an end view of a bottle formed in accordance with the present invention.

In carrying out my invention, I make use of a suitable material, such as glass, that is ductile at a certain temperature. An inner shell or receptacle 1 is molded or formed in any other suitable known manner from this substance, and is formed integrally with, or separately and permanently joined as at 2, to an outer shell or vacuum jacket 3. The latter has a length greater than that of the inner shell 1 and is open at its end opposite the point of junction with the inner shell 1, as best seen in Figure 2. The outer shell 3 conforms in configuration with the inner shell 1 and is spaced from the latter, as shown. A suitable non-conducting substance is introduced between the adjacent walls of the inner shell 1 and the outer shell 3 and is disposed in the neck portion of the bottle as indicated at 4. Any suitable composition that has the quality of being plastic or semi-fluid when mixed and then "setting" hard may be used, provided such composition is a good non-conductor of heat. When the space surrounding the neck of the inner shell 1 has been filled with the composition 4 in the manner described, the outer shell 3 is heated adjacent to the end thereof opposite the neck and is molded in any suitable manner into the position illustrated in Figure 3, at which time the outer shell 3 will be closed except for a relatively small central opening 5. The outer shell 3 is then inclined, as illustrated, and a determined quantity of the composition 4 is introduced through the opening 5 into the space between the inner shell 1 and the outer shell 3. This composition, being in a plastic or semi-fluid state, will assume by gravity the position illustrated in Figure 3 and it is permitted to harden while in this position. The outer casing 3 is then rotated one-third of a revolution while in inclined position and a like quantity of the composition 4 is again introduced through the opening 5 into the space between the inner shell 1 and the outer shell 3. After this quantity of the composition 4 has hardened, the shell 3 is rotated one-third of a revolution and a like amount of the composition 4 is then introduced through the opening 5 into the space between the inner shell 1 and the outer shell 3. When this last quantity of the composition 4 has hardened, the outer shell 3 will be spaced from the inner shell 1 at the closed end of the latter by three spaced apart portions of the hardened composition. These strengthening and spacing portions are separate, spaces being provided therebetween so that the air may be exhausted from the space between the inner shell and the outer shell in any suitable manner. The walls of the opening 5 are then heated to the point of fusion and molded in such a manner as to seal the outer casing at 6 as shown in Figure 4, leaving a vacuum between the inner shell 1 and the outer shell or jacket 3.

From the foregoing description of the various parts of the device, the operation thereof may be readily understood. The outer shell 3 is encased by a metallic casing 7 that is secured thereto in any suitable manner, as by means of a suitable cement 8. In Figure 1, the casing 7 is shown as being spaced from the casing 3 in order to permit the illustration of the cementing substance 8. In practice, the casing 7 fits the shell 3 closely. A stopper 9 of ordinary construction is provided for closing the mouth of the bottle. In the embodiment of the invention illustrated in Figure 1, the casing 7 is shown as having a threaded connection at 10 with a union 11 which has a threaded connection at 12 with an outer casing 13. A cap 14 is threaded on the union 11. The parts encasing the outer shell 3 are of special construction and have been made the subject of my concurrent application for patent for vacuum bottle.

In vacuum bottles of ordinary construction, of which I am aware, no spacing and strengthening means is provided between the inner shell and the outer shell or vacuum jacket at the neck of the bottle. Consequently, since the greater part of the stress placed on the bottle in service is imposed on the shells adjacent to the neck of the bottle and since the shells are made of a readily frangible material, such as glass, the possibility that the bottle will break adjacent to the neck is relatively great. Spacing members commonly known as "plugs" are introduced between the inner and outer shells in bottles of an ordinary construction before the outer shell is sealed at its end opposite the neck. These "plugs" are commonly made of fiber and in actual practice must be positioned a considerable distance from the end of the inner shell opposite the neck in order to preclude excessive strain on the shells adjacent to their ends opposite the neck of the bottle resulting from the construction of the walls of the outer shell when the latter is sealed. Furthermore, since the distance between the adjacent walls of the inner and outer shells varies at different points, it has been found impossible prior to my invention to satisfactorily space the outer shell from the inner shell at the points required, since if the "plug" is too thick for the distance between the shells at a particular point, an undue strain is placed on the shells and if the "plug" is not sufficiently thick to closely contact both the inner and outer shells, it obviously fails to fulfill the purpose for which intended.

When a bottle is formed in accordance with my invention, the inner and outer shells are spaced apart and reenforced at the neck, at which point the greatest strain results in service, and at the end of the bottle at the end opposite the neck, which is the portion of the inner shell that is subject to strain on account of the weight of a liquid placed within the bottle and on account of temperature changes induced by the changes in temperature of liquids placed in the bottle successively.

I claim:

1. A receptacle of the character described comprising an inner shell open at one end, an outer shell permanently joined to the inner shell at the open end of the latter and spaced from the inner shell at all other points, and a spacing and reenforcing self-hardening composition filling the space between the inner and outer shells at the junction of said shells, said composition being introduced between the shells while in a plastic state.

2. A vacuum bottle comprising an inner shell and an outer shell integral with the inner shell at one end and spaced therefrom at all other points, said shells being made of a frangible material, and a strengthening, spacing, and self-hardening composition partially filling the space between the inner and outer shells and introduced thereinto before the outer shell is sealed.

3. A vacuum bottle comprising an inner shell formed with a neck portion and closed at the end opposite the neck, an outer shell integral with said inner shell at the mouth of the neck portion and spaced from the inner shell at all other points, said shells being formed of a frangible ductile material, and a non-conducting spacing and strengthening composition filling the space between the neck portions of the shells and disposed at a plurality of points between the shells at the end of the bottle opposite the mouth of the latter, said composition being introduced between the shells while in a plastic state and before the outer shell is sealed.

4. The herein described process of forming vacuum bottles that consists in projecting a non-conducting composition in a plastic state into the space between a frangible receptacle and a frangible ductile vacuum jacket therefor to fill the space between the receptacle and the vacuum jacket at one end of the latter, constricting the vacuum jacket at its opposite end to close the latter except for a relatively small opening, projecting the composition while in a plastic state through the opening into the jacket and inclining the jacket to occasion the positioning of the last named quantity of composition adjacent to the opening, exhausting the air from the space between the receptacle and the jacket and then sealing the jacket.

ALBERT GIBSON HALE.